United States Patent
Huthmann et al.

(10) Patent No.: US 12,079,632 B2
(45) Date of Patent: Sep. 3, 2024

(54) SEQUENCE PARTITION BASED SCHEDULE OPTIMIZATION

(71) Applicant: EDGECORTIX INC., Tokyo (JP)

(72) Inventors: Jens Huthmann, Hyogo (JP); Sakyasingha Dasgupta, Tokyo (JP); Nikolay Nez, Tokyo (JP)

(73) Assignee: EDGECORTIX INC., Tokyo (JP)

( * ) Notice: Subject to any disclaimer, the term of this patent is extended or adjusted under 35 U.S.C. 154(b) by 56 days.

(21) Appl. No.: 18/067,016

(22) Filed: Dec. 16, 2022

(65) Prior Publication Data
US 2024/0202001 A1   Jun. 20, 2024

(51) Int. Cl.
*G06F 9/38* (2018.01)
*G06F 5/01* (2006.01)
*G06F 7/32* (2006.01)

(52) U.S. Cl.
CPC ............. *G06F 9/3838* (2013.01); *G06F 5/01* (2013.01); *G06F 7/32* (2013.01); *G06F 9/3856* (2023.08); *G06F 9/3861* (2013.01)

(58) Field of Classification Search
None
See application file for complete search history.

(56) References Cited

U.S. PATENT DOCUMENTS

| | | | | |
|---|---|---|---|---|
| 7,331,045 B2 * | 2/2008 | Martin | ................ | G06F 9/3838 717/160 |
| 7,930,688 B2 * | 4/2011 | Martin | ................ | G06F 9/3838 717/161 |
| 7,962,907 B2 * | 6/2011 | Martin | ................ | G06F 9/3838 717/161 |
| 10,191,724 B2 * | 1/2019 | Cheng | ................ | G06F 9/30145 |
| 10,915,324 B2 * | 2/2021 | Danilak | ................ | G06F 9/3893 |
| 11,144,497 B2 * | 10/2021 | Danilak | ................ | G06F 9/3869 |
| 11,163,581 B2 * | 11/2021 | Eyole | ................ | G06F 9/384 |
| 11,403,254 B2 * | 8/2022 | Danilak | ................ | G06F 8/451 |
| 11,604,629 B1 * | 3/2023 | Li | ................ | G06F 9/4881 |
| 11,755,528 B2 * | 9/2023 | Danilak | ................ | G06F 15/78 712/216 |
| 2005/0034111 A1 * | 2/2005 | Martin | ................ | G06F 8/4452 717/151 |
| 2007/0288911 A1 * | 12/2007 | Martin | ................ | G06F 8/4452 717/141 |
| 2008/0104373 A1 * | 5/2008 | Martin | ................ | G06F 9/3838 712/216 |
| 2018/0113713 A1 * | 4/2018 | Cheng | ................ | G06F 8/433 |

(Continued)

OTHER PUBLICATIONS

'Improving Data-dependent Applications in GPUs' by AmirAli Abdolrashidi, 2021. (Year: 2021).*

(Continued)

*Primary Examiner* — Steven G Snyder
(74) *Attorney, Agent, or Firm* — HAUPTMAN HAM, LLP

(57) ABSTRACT

Sequence partition based schedule optimization is performed by generating a sequence and a schedule based on the sequence, dividing the sequence into a plurality of sequence partitions based on the schedule and the data dependency graph, each sequence partition including a portion of the plurality of instructions and a portion of the plurality of buffers, performing, for each sequence partition, a plurality of partition optimizing iterations, and merging the plurality of sequence partitions to produce a merged schedule.

20 Claims, 9 Drawing Sheets

(56) References Cited

U.S. PATENT DOCUMENTS

| | | | | |
|---|---|---|---|---|
| 2020/0057639 A1* | 2/2020 | Danilak | ................ | G06F 9/3828 |
| 2020/0057642 A1* | 2/2020 | Danilak | ................ | G06F 9/3826 |
| 2020/0057646 A1* | 2/2020 | Danilak | ................ | G06F 9/3826 |
| 2021/0117204 A1* | 4/2021 | Eyole | .................... | G06F 9/3838 |
| 2022/0066982 A1* | 3/2022 | Danilak | ................ | G06F 9/3893 |
| 2023/0071862 A1* | 3/2023 | Li | ......................... | G06F 9/4881 |
| 2023/0123634 A1* | 4/2023 | Steinberger | ........... | G06F 9/3887 |
| | | | | 382/110 |
| 2023/0185549 A1* | 6/2023 | Li | ......................... | G06F 8/427 |
| | | | | 717/143 |

OTHER PUBLICATIONS

'Exploring Trade-Offs in Buffer Requirements and Throughput Constraints for Synchronous Dataow Graphs' by Sander Stuijk et al., 2006. (Year: 2006).*

'Parallel Numerics' by Professor Huckle, Technical University of Munich 2018. (Year: 2018).*

'Data-Dependency Graph Transformations for Instruction Scheduling' by Mark Heffernan et al., 2005. (Year: 2005).*

Machine Translation of Korean Patent Application KR KR 20090062286 A, 2009. (Year: 2009).*

Machine Translation of Chinese Patent Application CN 113296788 A, 2021. (Year: 2021).*

Ozkaya et al. "A scalable clustering-based task scheduler for homogeneous processors using DAG partitioning", 2019 IEEE International Parallel and Distributed Processing Symposium (IPDPS), US, IEEE, May 20, 2019, pp. 155-165, [ online], URL : https://ieeexplore.IEEE.org/document/8820781, DOI:10.1109/IPDPS.2019.00026, 12pp.

\* cited by examiner

SEQUENCE PARTITION BASED SCHEDULE OPTIMIZATION

BACKGROUND

The cost of computational power is becoming cheaper as more and more computational resources become packed into chips, such as integrated circuits. However, the full computational power of a given chip is not always utilized for every task. Tasks are programmed for a given chip to utilize the resources in parallel during execution. Instructions are assigned to be executed on spare units to increase utilization. However, not every resource can be utilized during every opportunity due to logical restrictions in the sequence of instructions. For example, instruction C requires output of instructions A and B, and therefore instruction C cannot be executed until instructions A and B are both executed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
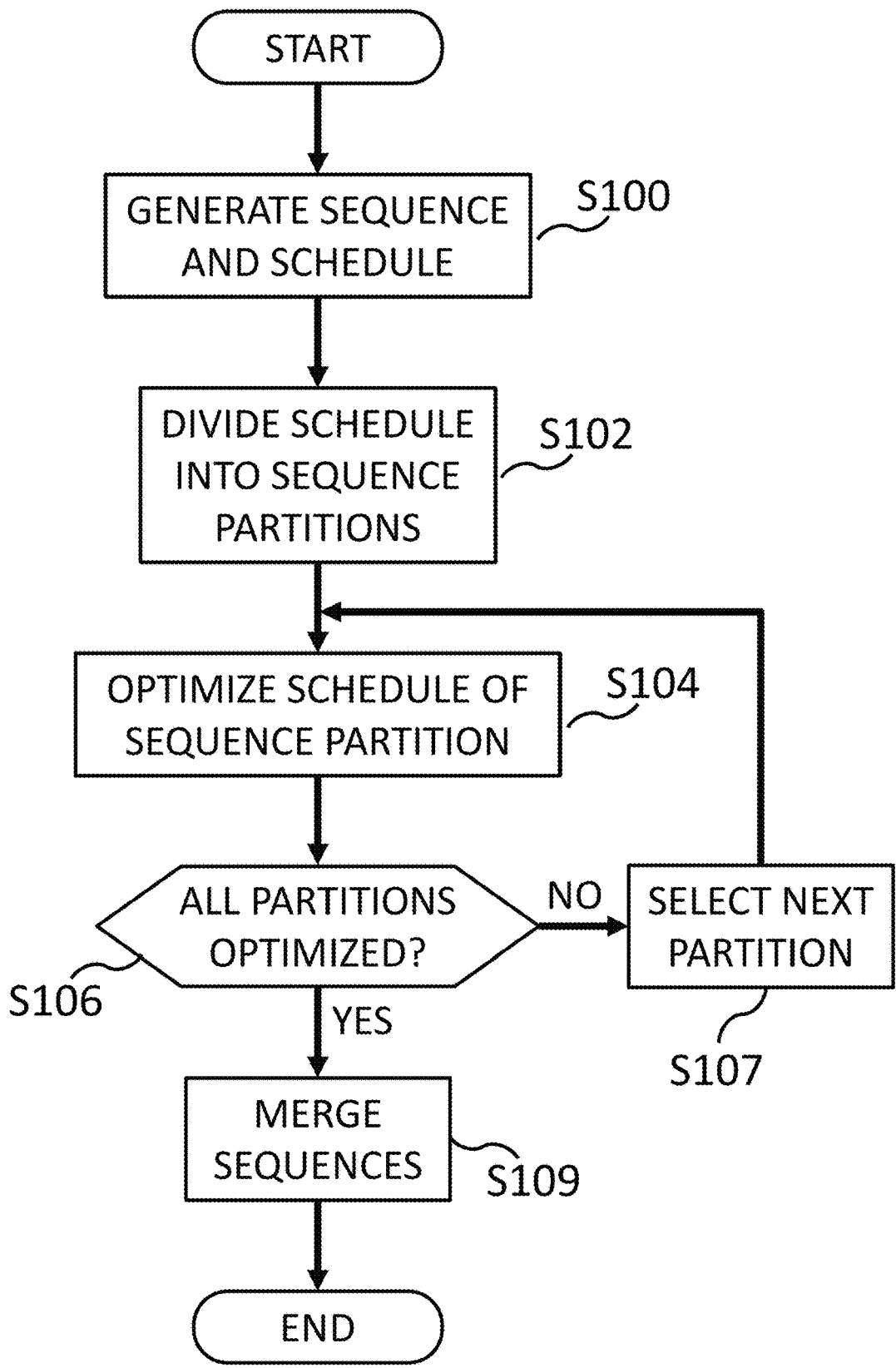
FIG. 1 is an operational flow for sequence partition based schedule optimization, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

In developing a program to be executed on a chip, program instructions are graphed out in a data dependency graph. The data dependency graph shows, for each instruction, all other instructions that must be executed before the instant instruction can be executed. A valid sequence of instructions will adhere to the data dependency graph. Executing the entire program on a single instruction unit of a chip would be relatively simple. However, such programming would leave all other instruction units un-utilized. To decrease the overall execution time, instructions of a program are assigned among a plurality of instruction units. In order to pass data between instruction units, buffers are assigned among a plurality of memory units.

As the number of instruction units and memory units of a chip increases, the number of possible sequences increases exponentially. A scheduling algorithm may greedily execute each instruction at the earliest possible time interval of a clock cycle, but scheduling is dependent on the assignments and the sequence. Changes to the assignments and the sequence may decrease the overall execution time, but the solution space may be vast and the cost function may have many local minima. Furthermore, any change to the assignments or the sequence may have ripple effects on everything else. Therefore, the scheduling algorithm is re-run for each change to the assignments or the sequence, and the process is repeated until the overall execution time is satisfactory.

In at least some embodiments of the present invention, a sequence is divided into partitions, and the changing and scheduling process is performed for each sequence partition, individually. In at least some embodiments, this results in a lower overall execution time of the final schedule than performing the changing and scheduling process for the whole sequence. In at least some embodiments, this also results in fewer computational resources used during the changing and scheduling process to arrive at the final schedule.

FIG. 1 is an operational flow for sequence partition based schedule optimization, according to at least one embodiment of the present invention. The operational flow provides a method of sequence partition based schedule optimization. In at least some embodiments, the method is performed by a controller of an apparatus including sections for performing certain operations, such as the controller and apparatus shown in FIG. 9, which will be explained hereinafter.

At S100, a generating section generates a sequence and a schedule. In at least some embodiments, the generating section generates a sequence from a data dependency graph of instructions and buffers. In at least some embodiments, the instructions and buffers of the data dependency graph are assigned to a plurality of instruction units and a plurality of memory units. In at least some embodiments, the schedule is generated from the sequence by allotting instructions and buffers to intervals of time according to a clock cycle. In at least some embodiments, the generating section performs the operational flow shown in FIG. 2, which will be explained hereinafter.

At S102, a dividing section divides a schedule into sequence partitions. In at least some embodiments, the dividing section divides a sequence into sequence partitions based on a schedule. In at least some embodiments, the dividing section divides the sequence into a plurality of sequence partitions based on the schedule and the data dependency graph, each sequence partition including a portion of the plurality of instructions and a portion of the plurality of buffers. In at least some embodiments, the dividing section modifies the sequence partitions to duplicate buffers at the boundary so that each sequence partition includes an instance of the duplicated buffer. In at least some embodiments, the dividing section performs the operational flow shown in FIG. 4, which will be explained hereinafter.

At S104, an optimizing section optimizes a schedule of sequence partitions. In at least some embodiments, the optimizing section performs, for each sequence partition, a plurality of partition optimizing iterations. In at least some embodiments, the optimizing section modifies the sequence partition in order to optimize the partition schedule. In at least some embodiments, the optimizing section performs the operational flow shown in FIG. 3, which will be explained hereinafter.

At S106, the controller or a section thereof determines whether all sequence partitions have been optimized. In at least some embodiments, the controller determines whether all of the sequence partitions resulting from the schedule dividing operation at S102 have undergone schedule optimization at S104. If the controller determines that un-optimized sequence partitions remain, then the operational flow proceeds to select the next partition (S107) before returning to schedule optimization at S104. If the controller determines that all sequence partitions have been optimized, then the operational flow proceeds to schedule merging at S109.

At S109, a merging section merges sequences. In at least some embodiments, the merging section merges the plurality of sequence partitions produce a merged schedule. In at least some embodiments, the merging section merges the sequence partitions as modified by the partition schedule optimization at S104 in order as in the original sequence generated at S100. In at least some embodiments, the merging section modifies the sequence partitions to remove duplicate buffers at the boundary. In at least some embodiments, the merging section performs a plurality of merged schedule optimizing iterations. In at least some embodiments, the merging section causes the optimizing section to perform the operational flow shown in FIG. 3, which will be explained hereinafter. In at least some embodiments, the merging section further schedules or causes the optimizing section to further schedule optimizations, such as by performing the operational flow shown in FIG. 8, which will be explained hereinafter.

Figure 2:
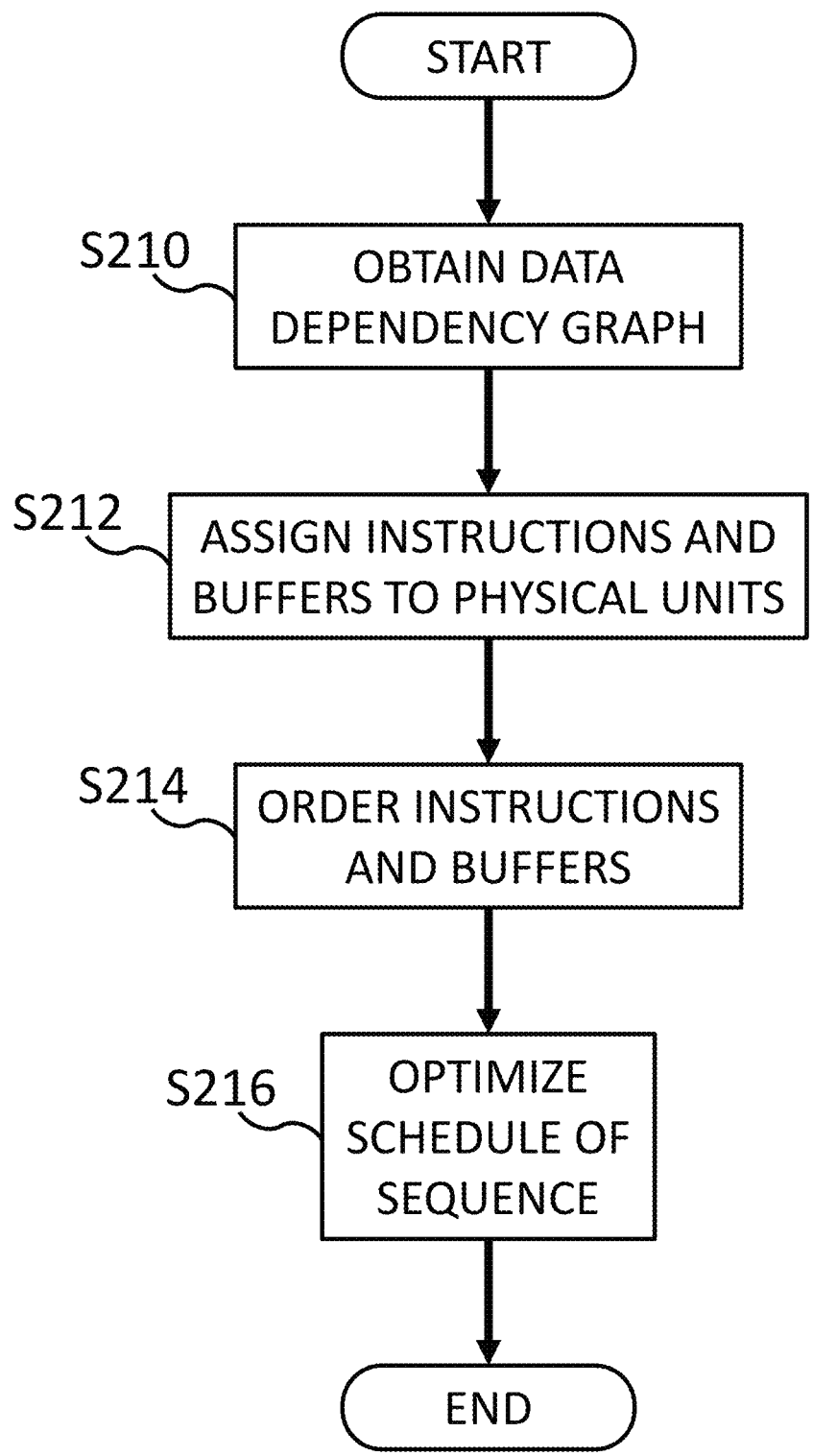
FIG. 2 is an operational flow for sequence and schedule generation, according to at least one embodiment of the present invention.

FIG. 2 is an operational flow for sequence and schedule generation, according to at least one embodiment of the present invention. The operational flow provides a method of sequence and schedule generation. In at least some embodiments, the method is performed by a generating section of an apparatus, such as the apparatus shown in FIG. 9, which will be explained hereinafter.

At S210, the generating section or a sub-section thereof obtains a data dependency graph. In at least some embodiments, the generating section converts a program script into a data dependency graph. In at least some embodiments, the generating section converts each instruction in the program script into a graph element, and connects each element in a manner showing, for each instruction, which instructions must be performed before the instruction. In at least some embodiments, the generating section converts programming code, such as PYTHON, JAVA, C++, or any other programming language. In at least some embodiments, the generating section converts a neural network specification into a data dependency graph. In at least some embodiments, the generating section receives a data dependency graph from another program or device, either directly or through a network.

At S212, the generating section or a sub-section thereof assigns instructions and buffers to physical units. In at least some embodiments, the generating section assigns each instruction among a plurality of instructions of a data dependency graph to a corresponding computation unit among a plurality of computation units and each buffer among a plurality of buffers of the data dependency graph to a corresponding memory unit among a plurality of memory units. In at least some embodiments, the generating section assigns instructions and buffers to computation units and memory units of an integrated circuit, such as an Application Specific Integrated Circuit (ASIC), Field-Programmable Gate Array (FPGA), or any other chip having processing elements and memory elements. In at least some embodiments, the generating section assigns instructions to computation units so that the instructions can be executed in parallel, and assigns buffers to memory units so that the computation units can share data necessary for executing instructions.

At S214, the generating section or a sub-section thereof orders the instructions and buffers. In at least some embodiments, the generating section orders the plurality of instructions and the plurality of buffers to produce a sequence. In at least some embodiments, the generating section orders the execution of instructions assigned to each computation unit and buffers assigned to each memory unit. In at least some embodiments, the generating section is configured to order the instructions and buffers in a manner that increases the likelihood of the sequence being valid without regard to the efficiency or degree of utilization of the computation units and memory units of the integrated circuit.

At S216, the generating section or a sub-section thereof optimizes a schedule of the sequence. In at least some embodiments, the generating section causes the optimizing section to optimize the schedule of the sequence. In at least some embodiments, the generating section or the optimizing section performs the operational flow shown in FIG. 3, which will be explained hereinafter.

Figure 3:
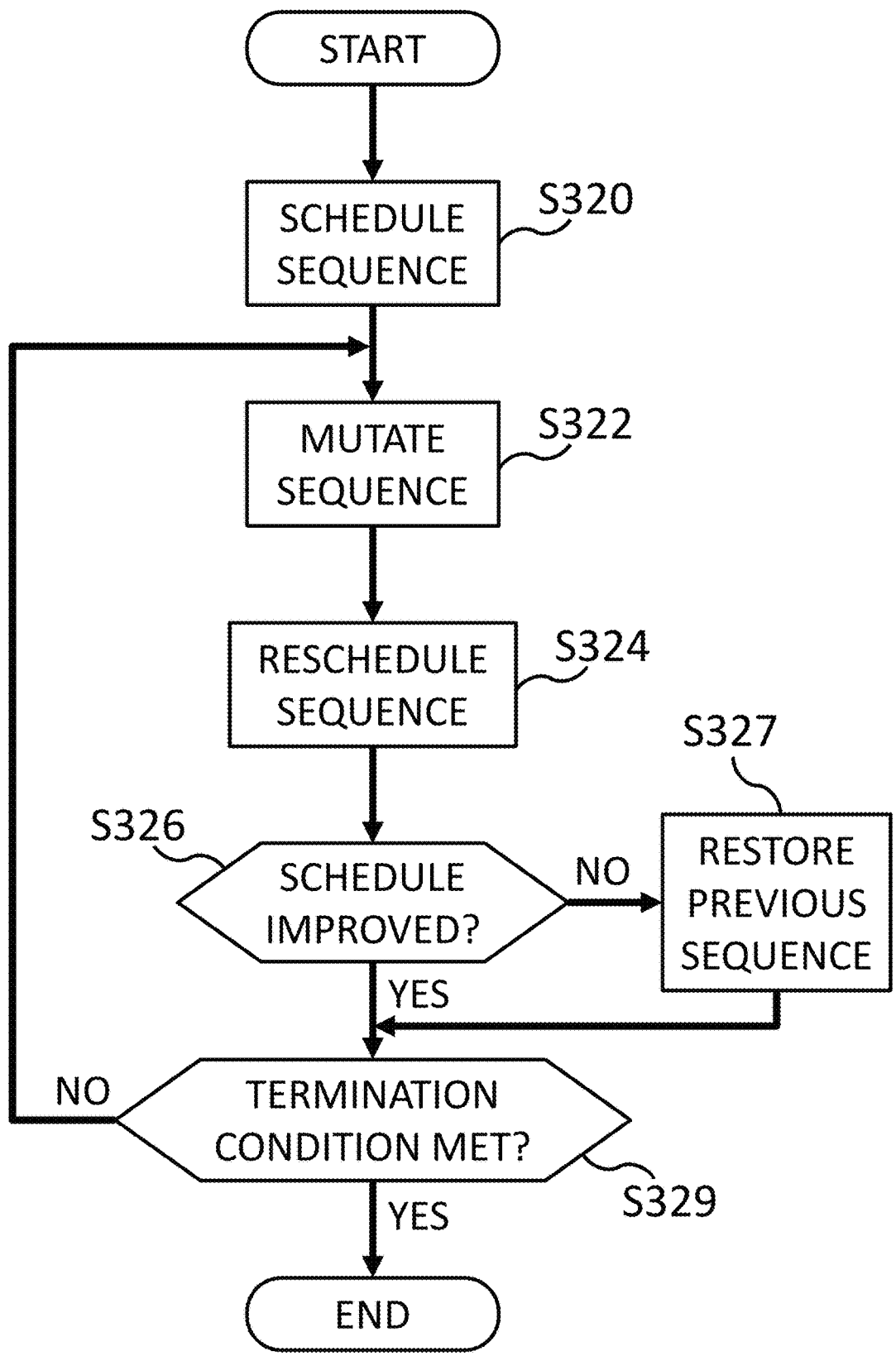
FIG. 3 is an operational flow for schedule optimization, according to at least one embodiment of the present invention.

FIG. 3 is an operational flow for schedule optimization, according to at least one embodiment of the present invention. The operational flow provides a method of schedule optimization. In at least some embodiments, the operational flow optimizes a schedule of a sequence or a partition schedule of a sequence partition. In at least some embodiments, the method is performed by an optimizing section of an apparatus, such as the apparatus shown in FIG. 9, which will be explained hereinafter.

At S320, the optimizing section or a sub-section thereof schedules a sequence or sequence partition. In at least some embodiments, the optimizing section produces a schedule based on the sequence or sequence partition. In at least some embodiments, the optimizing section allots the instructions among the plurality of instructions and the buffers among the plurality of buffers in the sequence to intervals of time. In at least some embodiments, the optimizing section allots the instructions among the portion of the plurality of instructions and the buffers among the portion of the plurality of buffers in a sequence partition to intervals of time to produce a partition schedule. In at least some embodiments, the optimizing section utilizes a scheduling algorithm to schedule the sequence or sequence partition. In at least some embodiments, the optimizing section utilizes a scheduling algorithm, such as a greedy scheduling algorithm, that determines the earliest time interval to allot each instruction and buffer, using the data dependency graph and integrated circuit capabilities as constraints, to minimize the overall execution time. In at least some embodiments, the optimizing section recognizes an invalid sequence in response to determining that it is not possible to proceed with any further instructions due to the constraints.

At S322, the optimizing section or a sub-section thereof mutates the sequence or the sequence partition. In at least some embodiments, the optimizing section reorders the instructions among the portion of the plurality of instructions in the sequence or sequence partition. In at least some embodiments, the optimizing section reassigns the instructions among the portion of the plurality of instructions in the sequence or sequence partition. In at least some embodiments, the optimizing section reassigns the buffers among the portion of the plurality of buffers in the sequence partition. In at least some embodiments, the optimizing section performs a plurality of mutations of different types. In at least some embodiments, the optimizing section determines a specific mutation based on heuristics developed from previous schedule optimizations. In at least some embodiments, the optimizing section determines mutations at random.

At S324, the optimizing section or a sub-section thereof reschedules the sequence or sequence partition. In at least some embodiments, the optimizing section produces a schedule based on the mutated sequence or sequence partition. In at least some embodiments, the optimizing section performs the same operation as the operation at S320, but with the mutated sequence or sequence partition.

At S326, the optimizing section or a sub-section thereof determines whether the schedule is improved. In at least some embodiments, the optimizing section determines whether the schedule produced in the current iteration of S326 is improved over the schedule produced in the previous iteration of S326. In at least some embodiments, the optimizing section determines whether the schedule produced in the first iteration of S326 is improved over the schedule produced by the operation of S320. In at least some embodiments, the optimizing section determines whether the schedule is improved based on multiple factors, such as whether the overall execution time has decreased, whether the degree of utilization has increased, whether there are any gaps in activity of any computation units, or whether more instructions are executed toward the beginning of the schedule or toward the end. If the optimizing section determines that the schedule is not improved, then the operational flow proceeds to previous sequence restoration at S327. If the optimizing section determines that the schedule is improved, then the operational flow proceeds to termination condition determination at S329.

At S327, the optimizing section or a sub-section thereof restores a previous sequence or sequence partition. In at least some embodiments, the optimizing section restores the sequence of a previous iteration in response to determining that a schedule of the previous iteration is more optimal than the schedule of a current iteration. In at least some embodiments, the optimizing section discards the mutated sequence or sequence partition produced at S322. In at least some embodiments, the optimizing section proceeds to the next iteration with the sequence or sequence partition of the previous iteration instead of the sequence or sequence partition of the current iteration, unless the optimizing section determines that the termination condition is met at S329.

At S329, the optimizing section or a sub-section thereof determines whether a termination condition is met. In at least some embodiments, the optimizing section determines that the termination condition is met after a predetermined number of iterations have been performed. In at least some embodiments, the optimizing section determines that the termination condition is met in response to a degree of utilization exceeding a threshold degree. In at least some embodiments, the optimizing section determines that the termination condition is met in response to the overall execution time becoming less than a threshold duration or a predetermined proportion of the overall execution time of the initial schedule produced by the operation at S320. If the optimizing section determines that the termination condition is not yet met, then the operational flow returns to sequence mutation at S322. If the optimizing section determines that the termination condition is met, then the operational flow ends.

Figure 4:
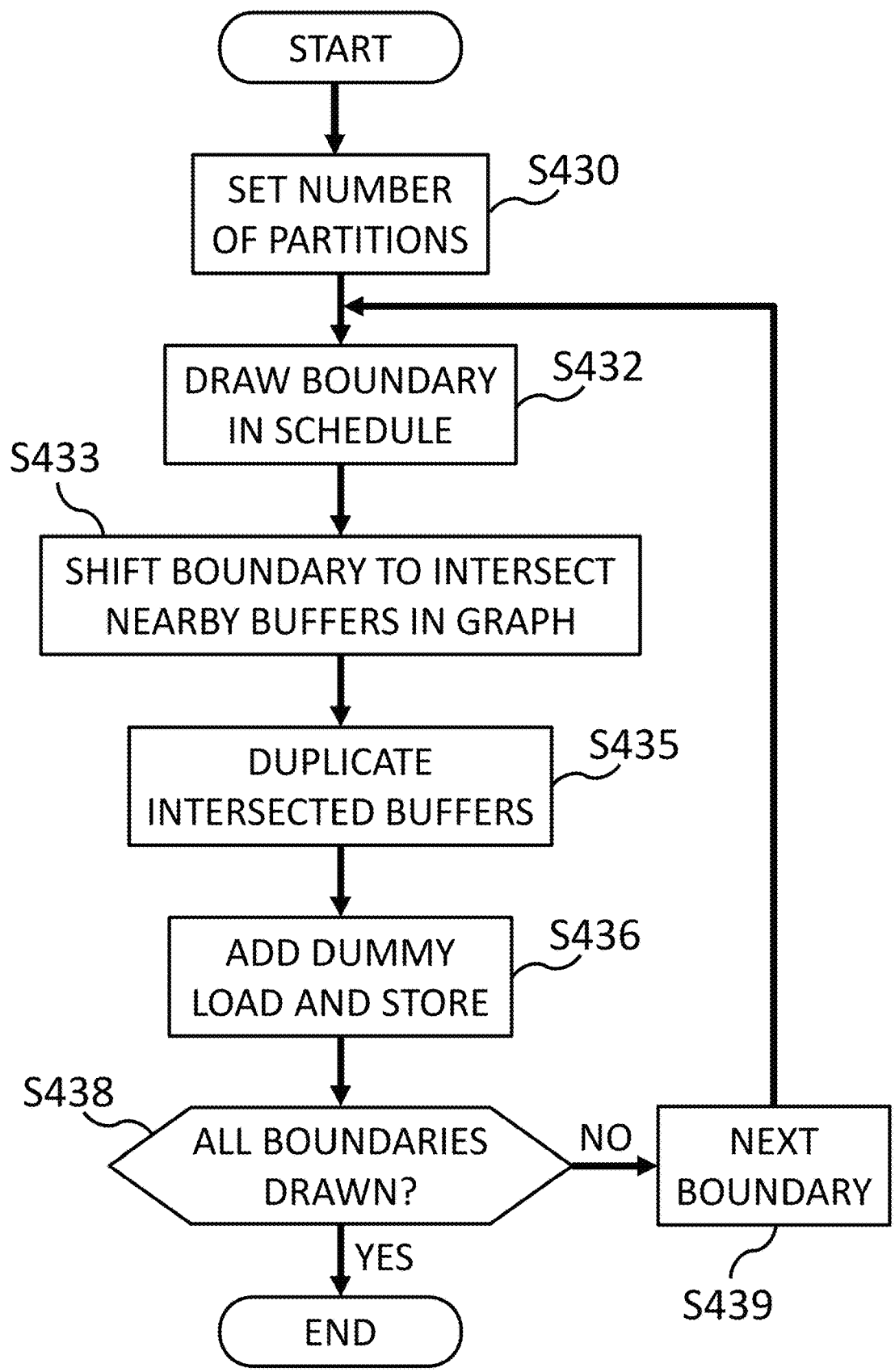
FIG. 4 is an operational flow for schedule division based sequence partitioning, according to at least one embodiment of the present invention.

FIG. 4 is an operational flow for schedule division based sequence partitioning, according to at least one embodiment of the present invention. The operational flow provides a method of schedule division based sequence partitioning. In at least some embodiments, the method is performed by a dividing section of an apparatus, such as the apparatus shown in FIG. 9, which will be explained hereinafter.

At S430, the dividing section or a sub-section thereof sets a number of partitions. In at least some embodiments, the dividing section sets a number of partitions into which to divide the sequence. In at least some embodiments, the dividing section divides the sequence into a number of sequence partitions of no less than three. In at least some embodiments, the dividing section divides the sequence into a number of sequence partitions such that each sequence has no less than about one-hundred instructions. In at least some embodiments, the dividing section sets the number of partitions according to heuristics from previous sequence partition based schedule optimizations, the heuristics based on one or more factors such as number of instructions and buffers, number of computation units and memory units, overall execution time of the optimized schedule, and amount of computational resources spent in optimizing the schedule.

At S432, the dividing section or a sub-section thereof draws a boundary in the schedule. In at least some embodiments, the dividing section visually or logically draws a boundary in the schedule. In at least some embodiments, the schedule is a two-dimensional table of instructions and buffers in which one axis represents time and the other axis represents the assigned instruction unit or memory unit. In at least some embodiments, the dividing section draws the boundary perpendicular to the axis representing time, the boundary separating earlier time intervals from later time intervals. In at least some embodiments, the dividing section draws the boundary such that the number of instructions in the earlier time intervals is in proportion to the total number of instructions in the sequence according to the number of partitions set by the operation at S430. In at least some embodiments, as iterations of operations S432, S433, S435, and S436 proceed, the dividing section draws a plurality of initial boundaries in the schedule.

At S433, the dividing section or a sub-section thereof shifts the boundary to intersect nearby buffers in the data dependency graph. In at least some embodiments, the dividing section draws boundaries in the sequence and the data dependency graph equivalent to the boundary drawn in the schedule. In at least some embodiments, the boundary drawn in the schedule is linear, but the boundaries drawn in the sequence and the data dependency graph are not likely to be linear. In at least some embodiments, the dividing section shifts the boundary or portions thereof so that the boundary separates instructions and buffers of one partition from instructions and buffers of another partition at one or more buffers. In at least some embodiments, the dividing section shifts the boundary so that the boundary only intersects buffers and does not intersect any instruction. In at least some embodiments, as iterations of operations S432, S433, S435, and S436 proceed, the dividing section shifts, for each boundary, the initial boundary to intersect buffers among the plurality of buffers in the data dependency graph.

Figure 5:
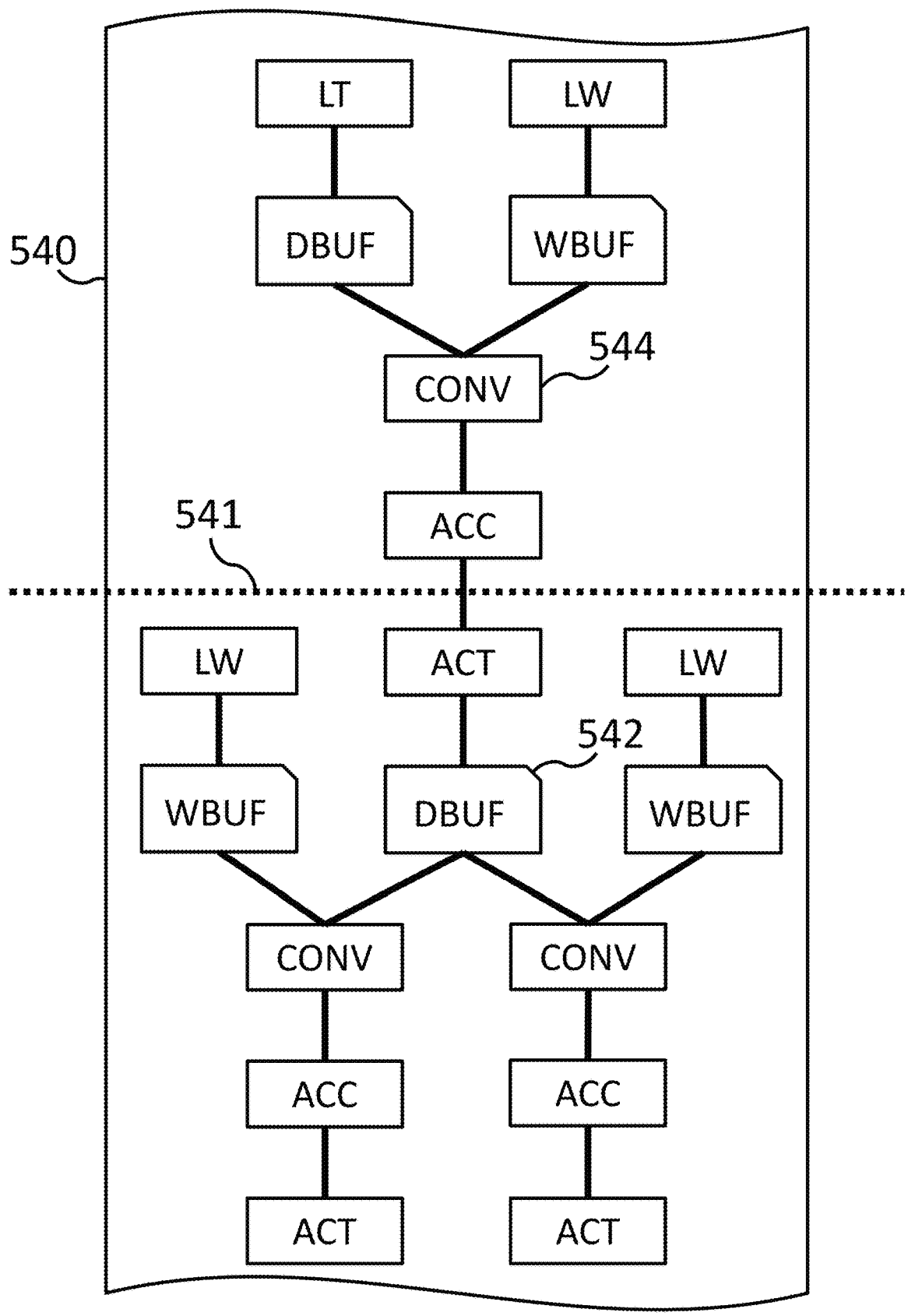
FIG. 5 is a portion of a data dependency graph having a boundary, according to at least one embodiment of the present invention.

FIG. 5 is a portion of a data dependency graph 540 having a boundary, according to at least one embodiment of the present invention. The portion of data dependency graph 540 includes a boundary 541, a data buffer 542, and a convolution instruction 544. Boundary 541 has been drawn through data dependency graph 540 between instructions and not through a data buffer. In at least some embodiments, boundary 541 is an example of an initial boundary drawn by a dividing section, such as in operation S432 of FIG. 4.

Figure 6:
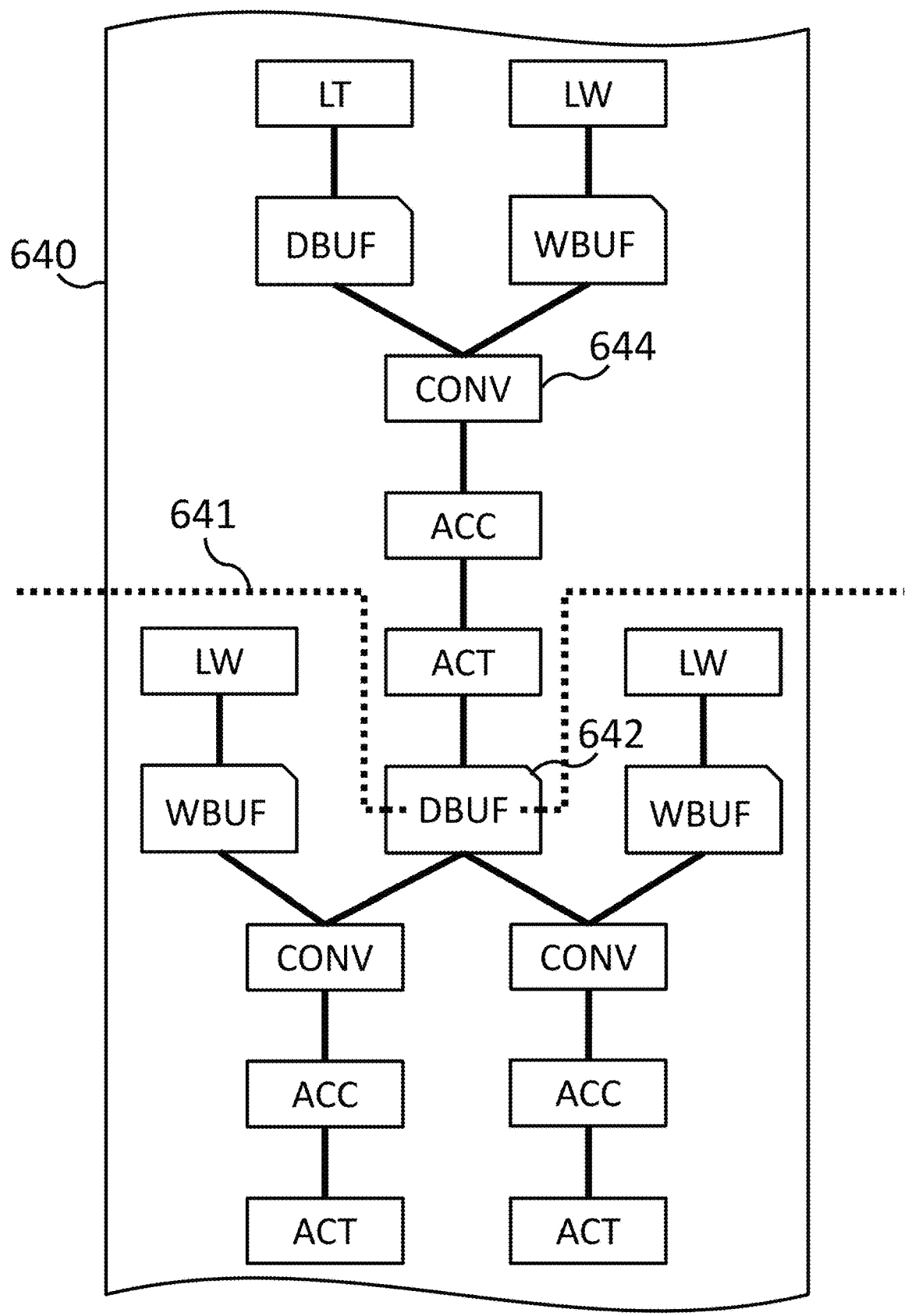
FIG. 6 is a portion of a data dependency graph having a shifted boundary, according to at least one embodiment of the present invention.

FIG. 6 is a portion of a data dependency graph 640 having a shifted boundary, according to at least one embodiment of the present invention. The portion of data dependency graph 640 includes a shifted boundary 641, a data buffer 642, and a convolution instruction 644. Shifted boundary 641 has been shifted from between instructions and not through a data buffer, as shown in FIG. 5, to go through data buffer 642. In at least some embodiments, shifted boundary 641 is an example of a boundary shifted by a dividing section, such as in operation S433 of FIG. 4.

At S435, the dividing section or a sub-section thereof duplicates intersected buffers. In at least some embodiments, the dividing section separates the data dependency graph by duplicating the intersected buffers, so that each side of the boundary includes an instance of the intersected buffer. In at least some embodiments, the dividing section duplicates the intersected buffers in the sequence in the same manner, to prepare the sequence for separation. In at least some embodiments, as iterations of operations S432, S433, S435, and S436 proceed, the dividing section duplicates each intersected buffer among the plurality of buffers.

At S436, the dividing section or a sub-section thereof adds dummy load instructions and dummy store instructions. In at least some embodiments, the dividing section adds, to each instance of the duplicated buffers on the earlier side of the boundary, a dummy store instruction to be executed after the buffer. In at least some embodiments, the dividing section adds, to each instance of the duplicated buffers on the later side of the boundary, a dummy load instruction to be executed before the buffer. In at least some embodiments, the dividing section must add dummy load instructions and dummy store instructions so that the scheduling algorithm will perform properly. In at least some embodiments, the dividing section forgoes adding dummy load instructions and dummy store instructions because the scheduling algorithm is adapted to perform with sequence partitions. In at least some embodiments, as iterations of operations S432, S433, S435, and S436 proceed, the dividing section adds dummy instructions to each intersected buffer and each duplicated buffer.

Figure 7:
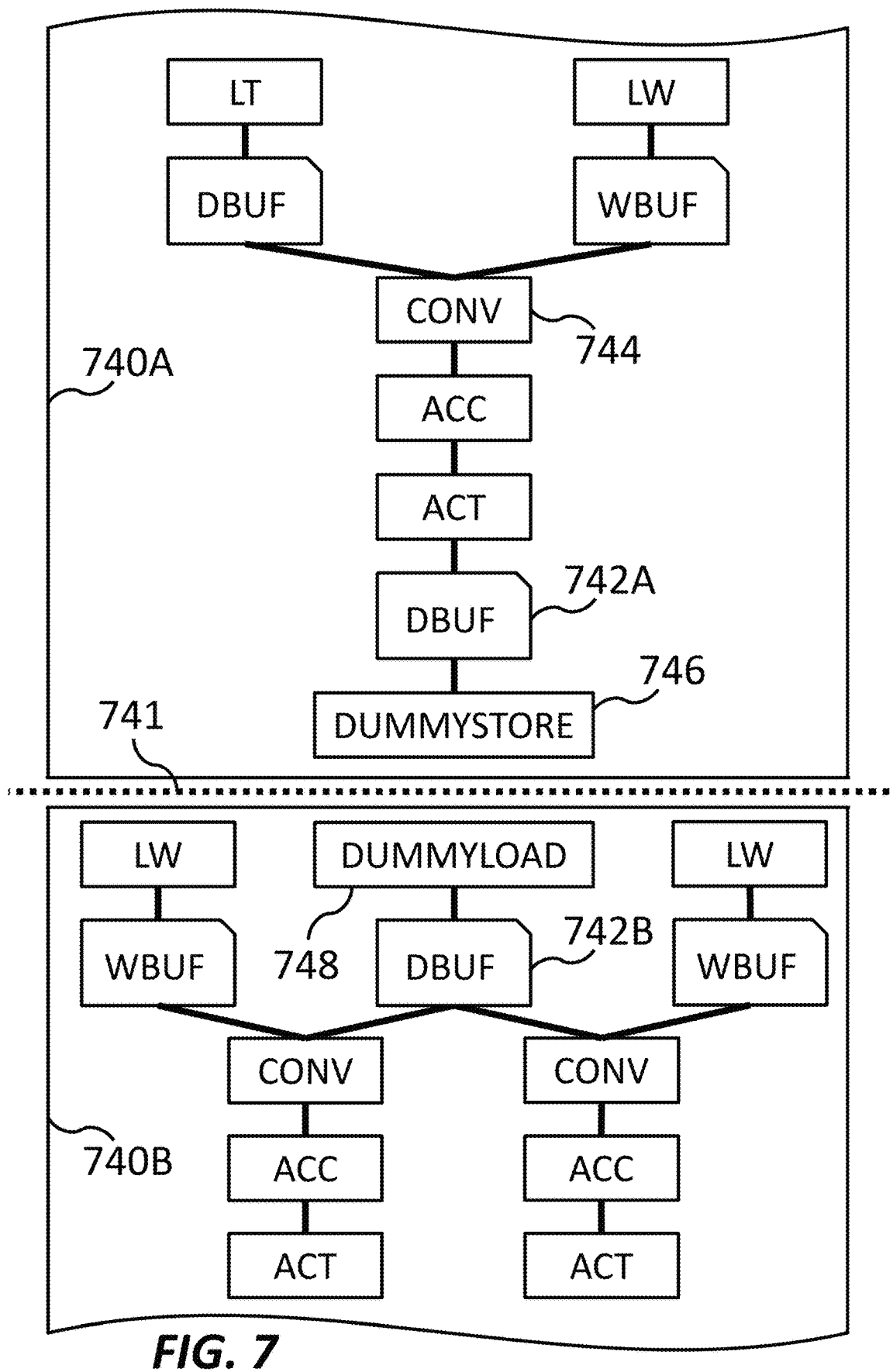
FIG. 7 is a portion of a data dependency graph being partitioned at a boundary, according to at least one embodiment of the present invention.

FIG. 7 is a portion of a data dependency graph being partitioned at a boundary, according to at least one embodiment of the present invention. The portion of data dependency graph includes a portion of data dependency graph partition 740A, a portion of data dependency graph partition 740B, and a boundary 741. Portion of data dependency graph partition 740A includes a duplicated data buffer instance 742A, a dummy store instruction 746, and a convolution instruction 744. Portion of data dependency graph partition 740B includes a duplicated data buffer instance 742B and a dummy load instruction 748. Portion of data dependency graph partition 740A has been separated from Portion of data dependency graph partition 740B by boundary 741. In at least some embodiments, sequence partitions based on the separation of the data dependency graph shown in FIG. 7 are ready for schedule optimization.

Figure 8:
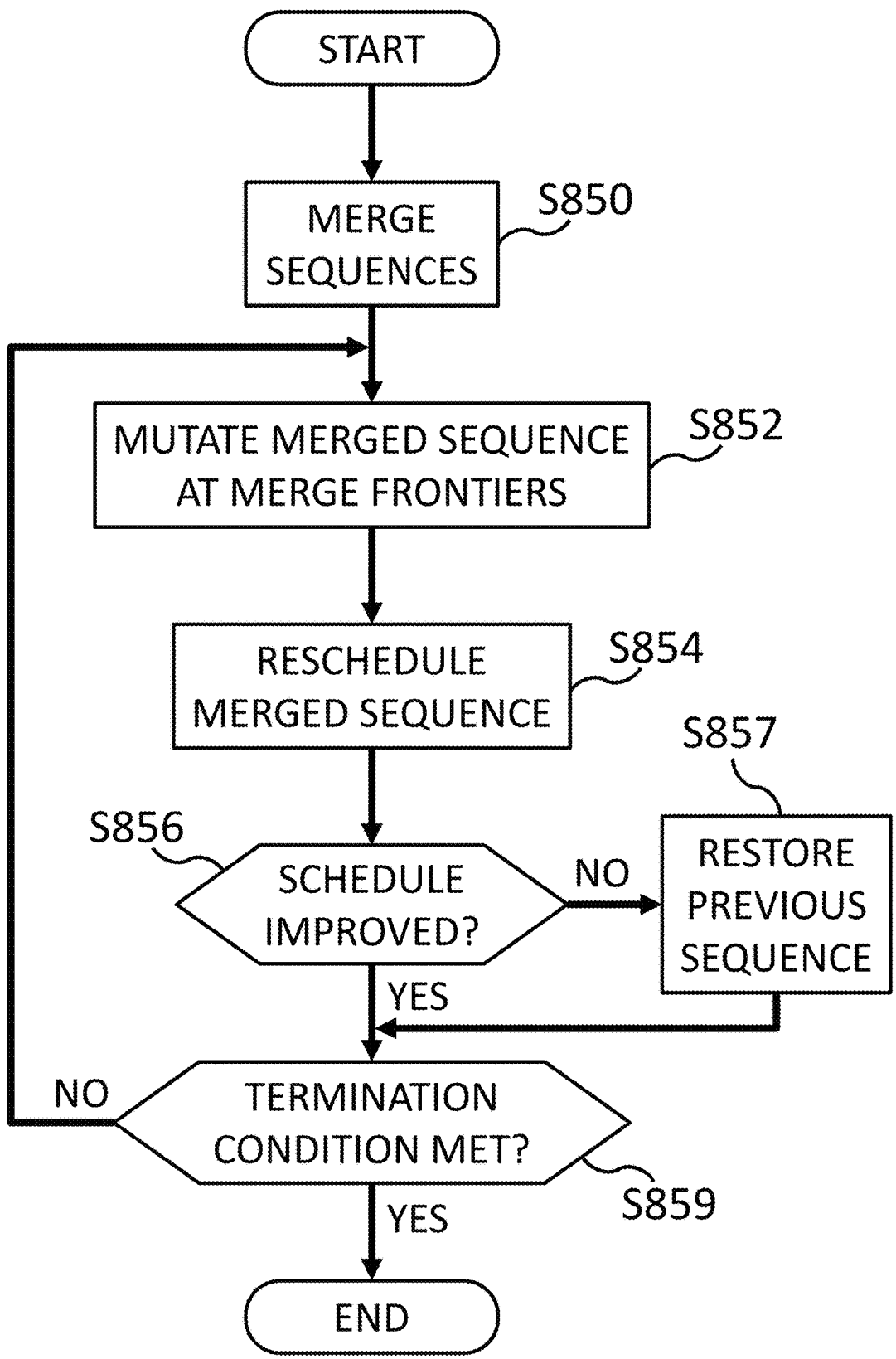
FIG. 8 is an operational flow for merged schedule optimization, according to at least one embodiment of the present invention.

FIG. 8 is an operational flow for merged schedule optimization, according to at least one embodiment of the present invention. The operational flow provides a method of merged schedule optimization. In at least some embodiments, the method is performed by an optimizing section of an apparatus, such as the apparatus shown in FIG. 9, which will be explained hereinafter.

At S850, the optimizing section or a sub-section thereof merges sequence partitions. In at least some embodiments, the optimizing section merges sequence partitions of a merged schedule, such as the merged schedule produced by operation S109 of FIG. 1. In at least some embodiments, the optimizing section merges the plurality of sequence partitions to produce a merged sequence after performing the plurality of partition optimizing iterations, such as iterations of the operational flow of FIG. 3.

At S852, the optimizing section or a sub-section thereof mutates the merged sequence at the merged frontiers. In at least some embodiments, the optimizing section mutates the merged sequence. In at least some embodiments, the optimizing section mutates the merged sequence to affect at least one instruction allotted to a time interval within a threshold number of time intervals from the time interval allotted to the buffer duplicated by the sequence division based on the merged schedule. In at least some embodiments, the optimizing section performs an operation similar to operation S322 of FIG. 3.

At S854, the optimizing section or a sub-section thereof reschedules the merged sequence. In at least some embodiments, the optimizing section allots the instructions among the plurality of instructions and the buffers among the plurality of buffers in the merged sequence to intervals of time to reproduce the merged schedule. In at least some embodiments, the optimizing section performs the same operation as operation S320 of FIG. 3, but with the mutated merged sequence.

At S856, the optimizing section or a sub-section thereof determines whether the merged schedule is improved. In at least some embodiments, the optimizing section determines whether the merged schedule produced in the current iteration of S854 is improved over the merged schedule produced in the previous iteration of S852. In at least some embodiments, the optimizing section determines whether the merged schedule produced in the first iteration of S854 is improved over the merged schedule produced by operation S109 of FIG. 1. In at least some embodiments, the optimizing section determines whether the merged schedule is improved based on multiple factors, such as whether the overall execution time has decreased, whether the degree of utilization has increased, whether there are any gaps in activity of any computation units, or whether more instructions are executed toward the beginning of the schedule or toward the end. If the optimizing section determines that the merged schedule is not improved, then the operational flow proceeds to previous sequence restoration at S857. If the optimizing section determines that the merged schedule is improved, then the operational flow proceeds to termination condition determination at S859.

At S857, the optimizing section or a sub-section thereof restores a previous sequence. In at least some embodiments, the optimizing section restores the sequence of a previous iteration in response to determining that the merged schedule of the previous iteration is more optimal than the merged schedule of a current iteration. In at least some embodiments, the optimizing section discards the mutated sequence produced at S852. In at least some embodiments, the optimizing section proceeds to the next iteration with the sequence of the previous iteration instead of the sequence of the current iteration, unless the optimizing section determines that the termination condition is met at S859.

At S859, the optimizing section or a sub-section thereof determines whether a termination condition is met. In at least some embodiments, the optimizing section determines that the termination condition is met after a predetermined number of iterations have been performed. In at least some embodiments, the optimizing section determines that the termination condition is met in response to a degree of utilization exceeding a threshold degree. In at least some embodiments, the optimizing section determines that the termination condition is met in response to the overall execution time becoming less than a threshold duration or a predetermined proportion of the overall execution time of the merged schedule produced by operation S109 of FIG. 1. If the optimizing section determines that the termination condition is not yet met, then the operational flow returns to merged sequence mutation at S852. If the optimizing section determines that the termination condition is met, then the operational flow ends.

Figure 9:
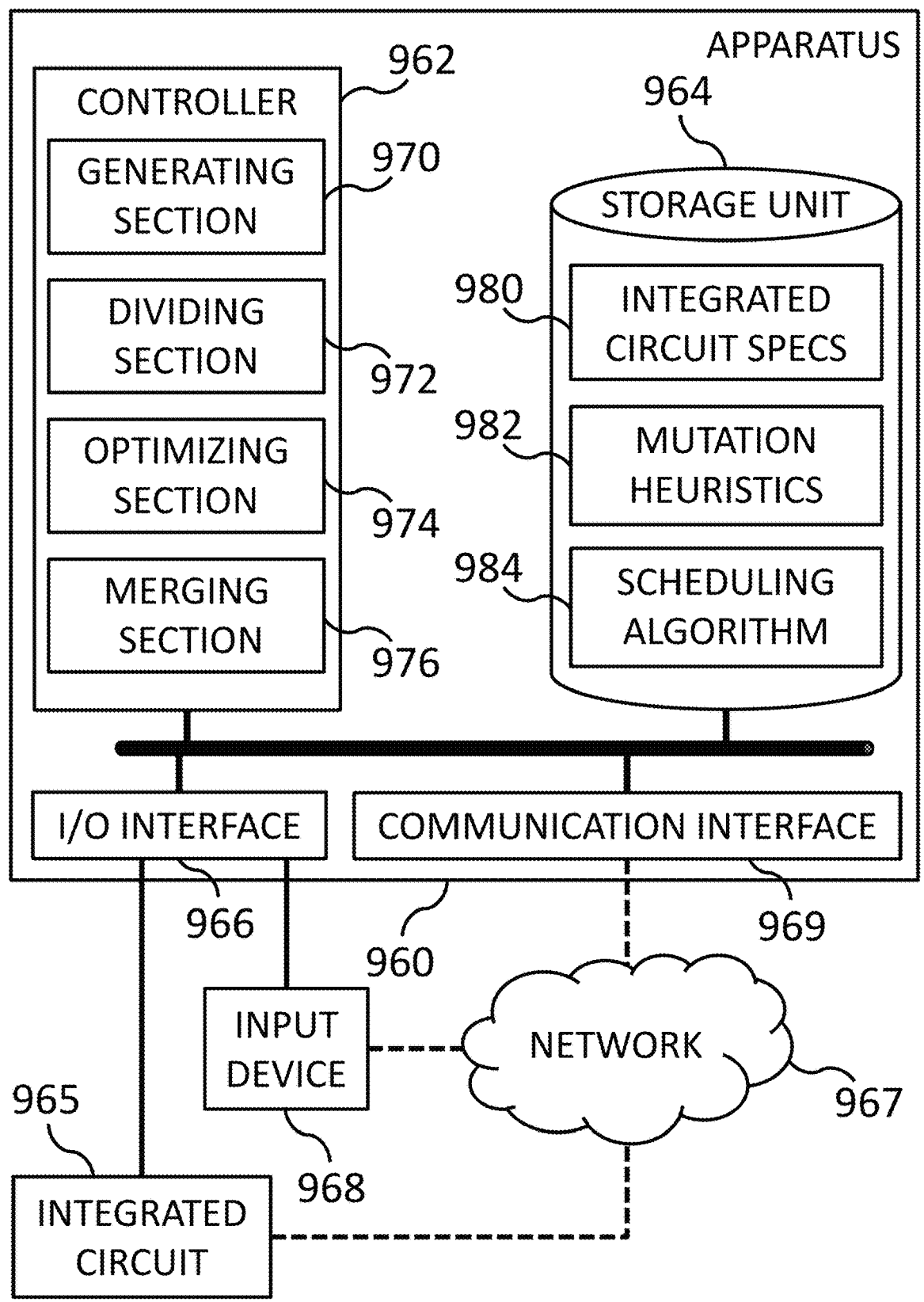
FIG. 9 is a block diagram of a hardware configuration for sequence partition based schedule optimization, according to at least some embodiments of the present invention.

FIG. 9 is a block diagram of a hardware configuration for sequence partition based schedule optimization, according to at least some embodiments of the present invention.

The exemplary hardware configuration includes apparatus 960, which interacts with input device 968 and integrated circuit 965 directly or through network 967. In at least some embodiments, apparatus 960 is a computer or other computing device that receives input or commands from input device 968. In at least some embodiments, apparatus 960 is integrated with input device 968. In at least some embodiments, apparatus 960 is a computer system that executes computer-readable instructions to perform operations for sequence partition based schedule optimization.

Apparatus 960 includes a controller 962, a storage unit 964, an input/output interface 966, and a communication interface 969. In at least some embodiments, controller 962 includes a processor or programmable circuitry executing instructions to cause the processor or programmable circuitry to perform operations according to the instructions. In at least some embodiments, controller 962 includes analog or digital programmable circuitry, or any combination thereof. In at least some embodiments, controller 962 includes physically separated storage or circuitry that interacts through communication. In at least some embodiments, storage unit 964 includes a non-volatile computer-readable medium capable of storing executable and non-executable data for access by controller 962 during execution of the instructions. Communication interface 969 transmits and receives data from network 967. Input/output interface 966 connects to various input and output units, such as input device 968, via a parallel port, a serial port, a keyboard port, a mouse port, a monitor port, and the like to accept commands and present information. In some embodiments, storage unit 964 is external from apparatus 960.

Controller 962 includes generating section 970, dividing section 972, optimizing section 974, and merging section 976. Storage unit 964 includes integrated circuit specifications 980, mutation heuristics 982, and scheduling algorithm 984.

Generating section 970 is the circuitry or instructions of controller 962 configured to generate sequences and schedules from data dependency graphs. In at least some embodiments, generating section 970 is configured to generate a sequence from a data dependency graph of instructions and buffers. In at least some embodiments, generating section 970 utilizes information in storage unit 964, such as integrated circuit specifications 980 and scheduling algorithm 984. In at least some embodiments, generating section 970 includes sub-sections for performing additional functions, as described in the foregoing flow charts. In at least some embodiments, such sub-sections is referred to by a name associated with a corresponding function.

Dividing section 972 is the circuitry or instructions of controller 962 configured to divide schedules to partition sequences. In at least some embodiments, dividing section 972 is configured to divide the sequence into a plurality of sequence partitions based on the schedule and the data dependency graph, each sequence partition including a portion of the plurality of instructions and a portion of the plurality of buffers. In at least some embodiments, dividing section 972 records information in storage unit 964. In at least some embodiments, dividing section 972 includes sub-sections for performing additional functions, as described in the foregoing flow charts. In at least some embodiments, such sub-sections is referred to by a name associated with a corresponding function.

Optimizing section 974 is the circuitry or instructions of controller 962 configured to optimize schedules. In at least some embodiments, optimizing section 974 is configured to perform a plurality of optimizing iterations. In at least some embodiments, optimizing section 974 utilizes information from storage unit 964, such as mutation heuristics 982 and scheduling algorithm 984. In at least some embodiments, optimizing section 974 includes sub-sections for performing additional functions, as described in the foregoing flow charts. In at least some embodiments, such sub-sections is referred to by a name associated with a corresponding function.

Merging section 976 is the circuitry or instructions of controller 962 configured to merge schedules and sequences. In at least some embodiments, merging section 976 is configured to merge a plurality of sequence partitions to produce a merged schedule. In at least some embodiments, merging section 976 records information to storage unit 964. In at least some embodiments, merging section 976 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, Sequence partition based schedule optimization is performed by generating a sequence and a schedule based on the sequence, dividing the sequence into a plurality of sequence partitions based on the schedule and the data dependency graph, each sequence partition including a portion of the plurality of instructions and a portion of the plurality of buffers, performing, for each sequence partition, a plurality of partition optimizing iterations, and merging the plurality of sequence partitions to produce a merged schedule.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein.

Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. A non-transitory computer-readable medium including instructions executable by a processor to cause the processor to perform operations comprising:
    assigning each instruction among a plurality of instructions of a data dependency graph to a corresponding computation unit among a plurality of computation units and each buffer among a plurality of buffers of the data dependency graph to a corresponding memory unit among a plurality of memory units;
    ordering the plurality of instructions and the plurality of buffers to produce a sequence;
    producing a schedule based on the sequence;
    dividing the sequence into a plurality of sequence partitions based on the schedule and the data dependency graph, each sequence partition including a portion of the plurality of instructions and a portion of the plurality of buffers;
    performing, for each sequence partition, a plurality of partition optimizing iterations of allotting the instructions among the portion of the plurality of instructions and the buffers among the portion of the plurality of buffers in the sequence partition to intervals of time to produce a partition schedule,
        restoring the sequence partition of a previous iteration in response to determining that a partition schedule of the previous iteration is more optimal than the partition schedule of a current iteration, and
        mutating the sequence partition; and
    merging the plurality of sequence partitions to produce a merged schedule.

2. The computer-readable medium of claim 1, wherein the operations further comprise
    merging the plurality of sequence partitions to produce a merged sequence after performing the plurality of partition optimizing iterations;
    performing a plurality of merged schedule optimizing iterations of
        mutating the merged sequence,
        allotting the instructions among the plurality of instructions and the buffers among the plurality of buffers in the merged sequence to intervals of time to reproduce the merged schedule, and
        restoring the sequence of a previous iteration in response to determining that the merged schedule of the previous iteration is more optimal than the merged schedule of a current iteration.

3. The computer-readable medium of claim 1, wherein the producing the schedule includes performing a plurality of schedule optimizing iterations of
    allotting the instructions among the plurality of instructions and the buffers among the plurality of buffers in the sequence to intervals of time,
    restoring the sequence of a previous iteration in response to determining that a schedule of the previous iteration is more optimal than the schedule of a current iteration, and
    mutating the sequence.

4. The computer-readable medium of claim 1, wherein the dividing the sequence includes:
    drawing a plurality of initial boundaries in the schedule;
    shifting, for each boundary, the initial boundary to intersect buffers among the plurality of buffers in the data dependency graph; and
    duplicating each intersected buffer among the plurality of buffers.

5. The computer-readable medium of claim 4, wherein the dividing the sequence further includes:
    adding dummy instructions to each intersected buffer and each duplicated buffer.

6. The computer-readable medium of claim 1, wherein the mutating includes performing at least one of:
    reordering the instructions among the portion of the plurality of instructions in the sequence partition,
    reassigning the instructions among the portion of the plurality of instructions in the sequence partition, or
    reassigning the buffers among the portion of the plurality of buffers in the sequence partition.

7. The computer-readable medium of claim 1, wherein the dividing the sequence includes dividing the sequence into a number of sequence partitions of no less than three.

8. The computer-readable medium of claim 1, wherein the dividing the sequence includes dividing the sequence into a number of sequence partitions such that each sequence has no less than one-hundred instructions.

9. A method comprising:
    assigning each instruction among a plurality of instructions of a data dependency graph to a corresponding computation unit among a plurality of computation units and each buffer among a plurality of buffers of the data dependency graph to a corresponding memory unit among a plurality of memory units;
    ordering the plurality of instructions and the plurality of buffers to produce a sequence;
    producing a schedule based on the sequence;
    dividing the sequence into a plurality of sequence partitions based on the schedule and the data dependency graph, each sequence partition including a portion of the plurality of instructions and a portion of the plurality of buffers;
    performing, for each sequence partition, a plurality of partition optimizing iterations of
        allotting the instructions among the portion of the plurality of instructions and the buffers among the portion of the plurality of buffers in the sequence partition to intervals of time to produce a partition schedule,
        restoring the sequence partition of a previous iteration in response to determining that a partition schedule of the previous iteration is more optimal than the partition schedule of a current iteration, and
        mutating the sequence partition; and
    merging the plurality of sequence partitions to produce a merged schedule.

10. The method of claim 9, further comprising
    merging the plurality of sequence partitions to produce a merged sequence after performing the plurality of partition optimizing iterations;
    performing a plurality of merged schedule optimizing iterations of
        mutating the merged sequence,
        allotting the instructions among the plurality of instructions and the buffers among the plurality of buffers in the merged sequence to intervals of time to reproduce the merged schedule, and
        restoring the sequence of a previous iteration in response to determining that the merged schedule of the previous iteration is more optimal than the merged schedule of a current iteration.

11. The method of claim 9, wherein the producing the schedule includes performing a plurality of schedule optimizing iterations of
allotting the instructions among the plurality of instructions and the buffers among the plurality of buffers in the sequence to intervals of time,
restoring the sequence of a previous iteration in response to determining that a schedule of the previous iteration is more optimal than the schedule of a current iteration, and
mutating the sequence.

12. The method of claim 9, wherein the dividing the sequence includes:
drawing a plurality of initial boundaries in the schedule;
shifting, for each boundary, the initial boundary to intersect buffers among the plurality of buffers in the data dependency graph; and
duplicating each intersected buffer among the plurality of buffers.

13. The method of claim 12, wherein the dividing the sequence further includes:
adding dummy instructions to each intersected buffer and each duplicated buffer.

14. The method of claim 9, wherein the mutating includes performing at least one of:
reordering the instructions among the portion of the plurality of instructions in the sequence partition,
reassigning the instructions among the portion of the plurality of instructions in the sequence partition, or
reassigning the buffers among the portion of the plurality of buffers in the sequence partition.

15. The method of claim 9, wherein the dividing the sequence includes dividing the sequence into a number of sequence partitions of no less than three.

16. The method of claim 9, wherein the dividing the sequence includes dividing the sequence into a number of sequence partitions such that each sequence has no less than one-hundred instructions.

17. An apparatus comprising:
a controller including circuitry configured to:
assign each instruction among a plurality of instructions of a data dependency graph to a corresponding computation unit among a plurality of computation units and each buffer among a plurality of buffers of the data dependency graph to a corresponding memory unit among a plurality of memory units;
order the plurality of instructions and the plurality of buffers to produce a sequence;
produce a schedule based on the sequence;
divide the sequence into a plurality of sequence partitions based on the schedule and the data dependency graph, each sequence partition including a portion of the plurality of instructions and a portion of the plurality of buffers;
perform, for each sequence partition, a plurality of partition optimizing iterations of
allotting the instructions among the portion of the plurality of instructions and the buffers among the portion of the plurality of buffers in the sequence partition to intervals of time to produce a partition schedule,
restoring the sequence partition of a previous iteration in response to determining that a partition schedule of the previous iteration is more optimal than the partition schedule of a current iteration, and
mutating the sequence partition;
merge the plurality of partition schedules produce a merged schedule.

18. The apparatus of claim 17, wherein the circuitry is further configured to
merge the plurality of sequence partitions to produce a merged sequence after performing the plurality of partition optimizing iterations;
perform a plurality of merged schedule optimizing iterations of
mutating the merged sequence,
allotting the instructions among the plurality of instructions and the buffers among the plurality of buffers in the merged sequence to intervals of time to reproduce the merged schedule, and
restoring the sequence of a previous iteration in response to determining that the merged schedule of the previous iteration is more optimal than the merged schedule of a current iteration.

19. The apparatus of claim 17, wherein the producing the schedule includes performing a plurality of schedule optimizing iterations of
allotting the instructions among the plurality of instructions and the buffers among the plurality of buffers in the sequence to intervals of time,
restoring the sequence of a previous iteration in response to determining that a schedule of the previous iteration is more optimal than the schedule of a current iteration, and
mutating the sequence.

20. The apparatus of claim 17, wherein the dividing the sequence includes:
drawing a plurality of initial boundaries in the schedule;
shifting, for each boundary, the initial boundary to intersect buffers among the plurality of buffers in the data dependency graph; and
duplicating each intersected buffer among the plurality of buffers.

* * * * *